United States Patent
Lee et al.

(10) Patent No.: US 10,869,205 B2
(45) Date of Patent: *Dec. 15, 2020

(54) METHOD FOR TRANSMITTING FRAME USING SELECTIVE BEAMFORMING AND APPARATUS FOR PERFORMING THE METHOD

(71) Applicant: Electronics and Telecommunications Research Institute, Daejeon (KR)

(72) Inventors: Yu Ro Lee, Daejeon (KR); Jae Woo Park, Daejeon (KR); Jae Seung Lee, Daejeon (KR); Jee Yon Choi, Daejeon (KR); Il Gyu Kim, Okcheon (KR); Seung Chan Bang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/659,840

(22) Filed: Oct. 22, 2019

(65) Prior Publication Data

US 2020/0053576 A1 Feb. 13, 2020

Related U.S. Application Data

(63) Continuation of application No. 16/259,058, filed on Jan. 28, 2019, now Pat. No. 10,506,453, which is a
(Continued)

(30) Foreign Application Priority Data

Aug. 11, 2014 (KR) .................. 10-2014-0103964
Jun. 30, 2015 (KR) .................. 10-2015-0093069

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0617* (2013.01); *H04B 7/0626* (2013.01); *H04W 72/0453* (2013.01); *H04W 72/085* (2013.01)

(58) Field of Classification Search
CPC ... H04B 7/0617; H04B 7/0626; H04W 16/28; H04W 72/0453; H04W 72/085
(Continued)

(56) References Cited

U.S. PATENT DOCUMENTS 8,483,200 B2     7/2013  Cha et al.
10,237,753 B2 *  3/2019  Lee .................. H04B 7/0626
(Continued)

FOREIGN PATENT DOCUMENTS

KR   10-2012-0100127 A    9/2012
KR   10-2014-0054034 A    5/2014
(Continued)

OTHER PUBLICATIONS

Kartsakli, Elli, et al. "A threshold-selective multiuser downlink MAC scheme for 802.11 n wireless networks." *Wireless Communications, IEEE Transactions on* 10.3 (2011): pp. 857-867.

Primary Examiner — Mark H Rinehart
Assistant Examiner — Kokou R Detse
(74) Attorney, Agent, or Firm — NSIP Law

(57) ABSTRACT

Disclosed are a frame transmission method using a selective beamforming and a communication apparatus to perform the frame transmission method. The communication apparatus may determine a beamforming matrix based on classification information in which a plurality of subcarriers used for communication is classified into a plurality of frequency units, may map a long training field (LTF) sequence to the beamforming matrix, and transmit a beamforming training (BF-T) frame including the mapped LTF sequence to a plurality of stations, may receive, from the plurality of
(Continued)

stations having receiving the BF-T frame, feedback information generated based on a reception strength of the BF-T frame, and may allocate frequency units to data frames to be transmitted to the plurality of stations based on the feedback information, and transmit the data frames using the allocated frequency units. The reception strength of the BF-T frame may be determined at each station for each frequency unit.

17 Claims, 16 Drawing Sheets

Related U.S. Application Data continuation of application No. 14/817,259, filed on Aug. 4, 2015, now Pat. No. 10,237,753.

(51) Int. Cl.
*H04W 72/04* (2009.01)
*H04W 72/08* (2009.01)

(58) Field of Classification Search
USPC .......................................................... 370/329
See application file for complete search history.

(56) References Cited

U.S. PATENT DOCUMENTS

| | | | |
|---|---|---|---|
| 10,506,453 B2 * | 12/2019 | Lee | ........................ H04B 7/0617 |
| 2008/0101211 A1 | 5/2008 | Rao | |
| 2012/0263158 A1 | 10/2012 | Lee et al. | |
| 2013/0301454 A1 | 11/2013 | Seol et al. | |
| 2014/0044045 A1 | 2/2014 | Shin | |
| 2014/0105159 A1 | 4/2014 | Kim | |
| 2015/0139205 A1 | 5/2015 | Kenney et al. | |
| 2015/0146812 A1 | 5/2015 | Chu et al. | |
| 2015/0207599 A1 | 7/2015 | Kim et al. | |

FOREIGN PATENT DOCUMENTS

| | | | |
|---|---|---|---|
| WO | WO 2012/125821 A1 | 9/2012 | |
| WO | WO 2014/066785 A1 | 5/2014 | |

* cited by examiner

FIG. 8

| FU index \ Data frame | Data frame 1 | Data frame 2-1 | Data frame 2-2 |
|---|---|---|---|
| FU0 | 1 | 0 | 0 |
| FU1 | 0 | 0 | 1 |
| FU2 | 1 | 0 | 1 |
| FU3 | 0 | 1 | 0 |
| FU4 | 0 | 1 | 1 |
| FU5 | 0 | 0 | 1 |
| FU6 | 0 | 0 | 1 |
| FU7 | 1 | 1 | 0 |
| FU8 | 1 | 0 | 0 |
| FU9 | 0 | 1 | 1 |
| FU10 | 1 | 0 | 1 |
| FU11 | 1 | 0 | 1 |
| FU12 | 0 | 0 | 0 |
| FU13 | 0 | 1 | 0 |
| FU14 | 1 | 0 | 0 |
| FU15 | 1 | 0 | 0 |

METHOD FOR TRANSMITTING FRAME USING SELECTIVE BEAMFORMING AND APPARATUS FOR PERFORMING THE METHOD

CROSS-REFERENCE TO RELATED APPLICATIONS

This application is a Continuation Application of U.S. patent application Ser. No. 16/259,058, filed on Jan. 28, 2019, now U.S. Pat. No. 10,506,453 issued or Dec. 10, 2019, which is a Continuation Application of U.S. application Ser. No. 14/817,259 filed on Aug. 4, 2015, now U.S. Pat. No. 10,237,753 issued on Mar. 19, 2019, which claims the priority benefit of Korean Patent Application No. 10-2014-0103964, filed on Aug. 11, 2014, and Korean Patent Application No. 10-2015-0093069, filed on Jun. 30, 2015, in the Korean Intellectual Property Office, the disclosures of which are incorporated herein by reference.

BACKGROUND

1. Field of the Invention

The following description relates to a frame transmission method using a selective beamforming scheme and a communication apparatus to perform the frame transmission method, and more particularly, to a method and apparatus for transmitting a frame using a beamforming matrix determined regardless of channel information between a communication apparatus and stations.

2. Description of the Related Art

A local area network (LAN) that is a near field communication (NFC) network is generally classified into a wired LAN and a wireless LAN (WLAN). The WLAN refers to a method of performing communication over a network using radio waves instead of using a cable. The WLAN has been emerged as an alternative solution to outperform difficulties found in an installation, a maintenance and repair, and a mobility of cabling. The necessity of the WLAN is on increase according to an increase in users of mobile devices.

A WLAN system includes an access point (AP) and a station (STA). The AP refers to a device that transmits radio waves so that STAs may connect to the Internet and use a network within service coverage.

A basic configuration block of the WLAN system defined in Institute of Electrical and Electronics Engineers (IEEE) 802.11 is a basic service set (BSS). Types of BSS includes, for example, an independent BSS in which STAs within a BSS perform mutual direct communication, an infrastructure BSS in which an AP intervenes in a process of a STA performing communication with another STA inside or outside a BSS, and an extended service set in which service coverage is extended by connecting different BSSs.

According to an increase in the number of STAs included in a single BSS, feedback overhead for communication between an AP and STAs also increases. Accordingly, there is a need for a communication method that may effectively decrease feedback overhead in a situation in which many STAs are present.

SUMMARY

Embodiments provide a method and apparatus that may prevent an increase in feedback overhead according to an increase in the number of transmit antennas of a communication apparatus and the number of receive antennas of a station (STA) by feeding back a reception strength of a signal received at the STA from the communication apparatus.

Embodiments also provide a method and apparatus that may effectively decrease feedback overhead between a communication apparatus and STAs by transmitting a beamforming training (BF-T) frame using a beamforming matrix determined regardless of channel information between the communication apparatus and the STAs.

Embodiments also provide a method and apparatus that may effectively decrease complexity of a feedback information generating process of an STA or a beamforming matrix determining process of a communication apparatus since the STA does not generate a feedback matrix based on a channel matrix and the communication apparatus does not determine a beamforming matrix based on the feedback matrix.

According to an embodiment, there is provided a frame transmission method of a communication apparatus performing communication with a plurality of stations, the method including determining a beamforming matrix based on classification information in which a plurality of subcarriers used for the communication is classified into a plurality of frequency units; mapping a long training field (LTF) sequence to the beamforming matrix, and transmitting a beamforming training (BF-T) frame including the mapped LTF sequence to the plurality of stations; receiving, from the plurality of stations having receiving the BF-T frame, feedback information generated based on a reception strength of the BF-T frame; and allocating frequency units to data frames to be transmitted to the plurality of stations based on the feedback information, and transmitting the data frames using the allocated frequency units. The reception strength of the BF-T frame may be determined at each station for each frequency unit.

The determining of the beamforming matrix may include determining the beamforming matrix regardless of channel information between the communication apparatus and the plurality of stations.

The reception strength of the BF-T frame may include information about a modulation and coding scheme (MCS) or a signal-to-interference and noise ratio (SINR) of the BF-T frame at the plurality of frequency units.

The transmitting of the data frames may include verifying at least one frequency unit having a reception strength greater than a preset threshold strength among the plurality of frequency units based on the feedback information, and allocating the verified at least one frequency unit to a data frame corresponding to the feedback information.

The transmitting of the data frames may include transmitting the data frames by mapping data to at least one subcarrier corresponding to the allocated frequency units, and by mapping the mapped data to the beamforming matrix according to the allocated frequency units.

The transmitting of the data frames may include including, in the data frames, first allocation information about the frequency units allocated to the plurality of stations in a non-beamformed state, and transmitting the data frames to the plurality of stations.

The first allocation information may sequentially include information about a frequency unit allocated for each data frame.

The first allocation information may sequentially include information about a data frame allocated for each frequency unit.

The transmitting of the data frames may include including, in the data frames, second allocation information about a frequency unit allocated to a target station to receive the data frame in a beamformed state, and transmitting the data frames to the target station.

The frequency units may correspond to at least one subcarrier to which the same beamforming matrix is to be applied.

According to another embodiment, there is provided a communication apparatus including a communicator configured to perform communication with a plurality of stations; and a processor configured to control the communicator. The processor may be further configured to determine a beamforming matrix based on classification information in which a plurality of subcarriers used for the communication is classified into a plurality of frequency units, to map a long training field (LTF) sequence to the beamforming matrix, and transmit a beamforming training (BF-T) frame including the mapped LTF sequence to the plurality of stations, to receive, from the plurality of stations having receiving the BF-T frame, feedback information generated based on a reception strength of the BF-T frame, and to allocate frequency units to data frames to be transmitted to the plurality of stations based on the feedback information, and transmit the data frames using the allocated frequency units. The reception strength of the BF-T frame may be determined at each station for each frequency unit.

EFFECT

According to embodiments, it is possible to prevent an increase in feedback overhead according to an increase in the number of transmit antennas of a communication apparatus and the number of receive antennas of a station (STA) by feeding back a reception strength of a signal received at the STA from the communication apparatus.

Also, according to embodiments, it is possible to effectively decrease feedback overhead between a communication apparatus and STAs by transmitting a beamforming training (BF-T) frame using a beamforming matrix determined regardless of channel information between the communication apparatus and the STAs.

Also, according to embodiments, it is possible to effectively decrease complexity of a feedback information generating process of an STA or a process of a beamforming matrix determining communication apparatus since the STA does not generate a feedback matrix based on a channel matrix and the communication apparatus does not determine a beamforming matrix based on the feedback matrix.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 8 illustrates an example of a frequency unit allocated to an STA according to an embodiment;

DETAILED DESCRIPTION

Figure 1:
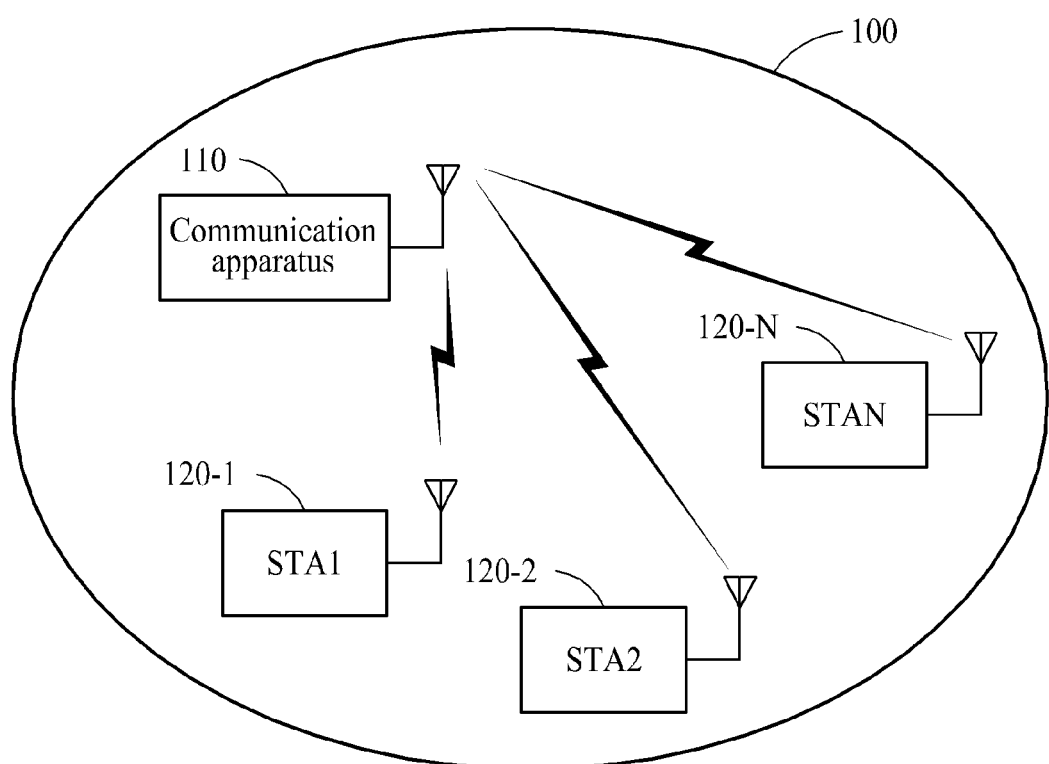
FIG. 1 is a diagram illustrating a communication environment in which a plurality of stations (STAs) is included in a basic service set (BSS) according to an embodiment.

Hereinafter, embodiments will be described with reference to the accompanying drawings. The following specific structural through functional descriptions are provided as examples to describe the embodiments and thus, the scope of the embodiments should not be interpreted to be limiting. Those skilled in the art may make various changes and modifications from the following description. Also, like reference numerals in the drawings refer to like elements throughout and the known functions and structures will be omitted.

FIG. 1 is a diagram illustrating a communication environment in which a plurality of stations (STAs) is included in a basic service set (BSS) according to an embodiment;

A wireless local area network (WLAN) may include at least one BSS. The BSS may include an access point (AP) and at least one STA.

The AP refers to a functional entity that provides a connection to a distribution system via a wireless medium for an STA associated with the AP. The AP may communicate with at least one STA, for example, an STA1 120-1, an STA2 120-2, and an STAN 120-N at a predetermined point in time in a downlink.

The downlink refers to a communication link from the AP to STAs and an uplink refers to a communication link from the STAs to the AP.

For example, the AP may also be referred to as a central controller, a base station (BS), a node-B, or a base transceiver system (BTS), and may be configured as the same.

The STA may also be referred to as a mobile terminal, a wireless device, a wireless transmit/receive unit (WTRU), a user equipment (UE), a mobile station (MS), a mobile subscriber unit (MSU), or simply a user, and may be configured as the same.

The AP may simultaneously transmit data to an STA group including at least one STA among a plurality of STAs associated with the AP. Here, the term "simultaneously" may indicate being within temporally identical or preset error range.

A WLAN system supports multi-user multiple input multiple output (MU-MIMO) communication. In a MU-MIMO communication system, the AP may transmit a plurality of spatial streams to a plurality of STAs using multiple antennas. Also, when the AP uses a plurality of transmit antennas, the AP may also transmit data frames to STAs using a beamforming technology in order to enhance the transmit performance. The AP may also be referred to as a communication apparatus, and the AP and the communication apparatus may be interchangeably used throughout for conciseness.

A wireless transmission environment of the WLAN system of FIG. 1 indicates a BSS 100 that includes a single communication apparatus 110 and a plurality of STAs, for example, the STA1 120-1, the STA2 120-2, and the STAN 120-N. The communication apparatus 110 may transmit data frames to the plurality of STAs, for example, the STA1 120-1, the STA2 120-2, and the STAN 120-N, using beamforming technology.

A frequency band used for communication between the communication apparatus 110 and the plurality of STAs, for example, the STA1 120-1, the STA2 120-2, and the STAN 120-N, may include a plurality of subcarriers. The communication apparatus 110 may classify the plurality of subcarriers into a plurality of frequency units, and may selectively allocate frequency units to data frames to be transmitted to the plurality of STAs, for example, the STA1 120-1, the STA2 120-2, and the STAN 120-N, based on information fed back from the plurality of STAs, for example, the STA1 120-1, the STA2 120-2, and the STAN 120-N. The communication apparatus 110 transmits data frames to the plurality of STAs, for example, the STA1 120-1, the STA2 120-2, and the STAN 120-N using the selectively allocated frequency units.

Here, the communication apparatus 110 determines a beamforming matrix regardless of channel information formed with the plurality of STAs, for example, the STA1 120-1, the STA2 120-2, and the STAN 120-N, and transmits training frames to the plurality of STAs, for example, the STA1 120-1, the STA2 120-2, and the STAN 120-N, using the determined beamforming matrix. Each of the plurality of STAs, for example, the STA1 120-1, the STA2 120-2, and the STAN 120-N, generates a feedback signal based on a reception strength of a received training frame, and feeds back the feedback signal to the communication apparatus 110. The communication apparatus 110 may allocate frequency units to data frames to be transmitted to the plurality of STAs, for example, the STA1 120-1, the STA2 120-2, and the STAN 120-N, based on feedback information, and may transmit data frames to the plurality of STAs, for example, the STA1 120-1, the STA2 120-2, and the STAN 120-N, using the allocated frequency units.

Figure 2:
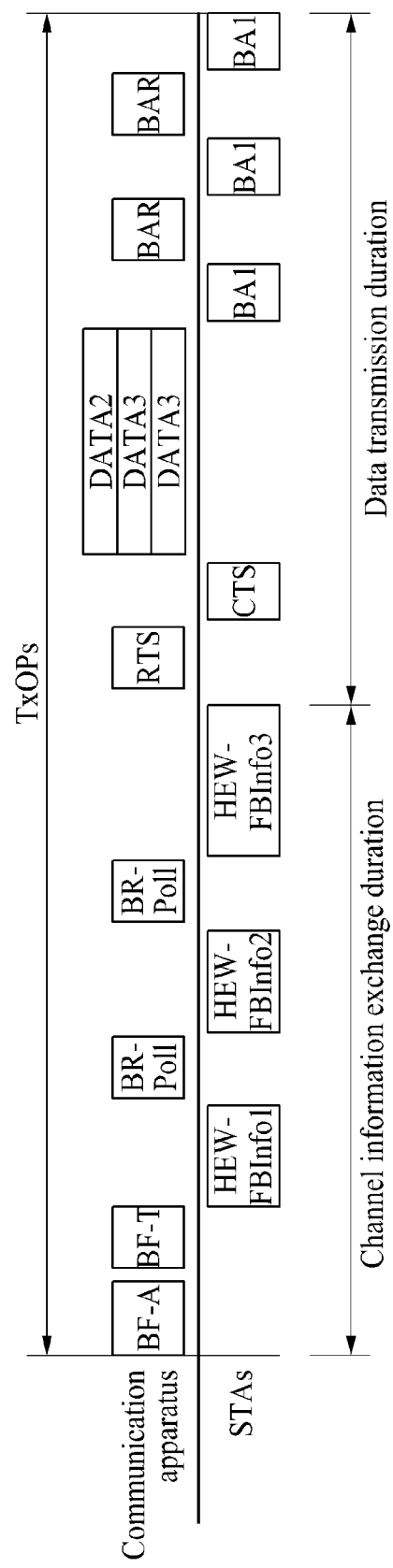
FIG. 2 illustrates a process of performing communication using an explicit feedback method according to an embodiment.

FIG. 2 illustrates a process of performing communication using an explicit feedback method according to an embodiment.

According to an embodiment, a communication apparatus and STAs may perform communication by exchanging frames in a physical protocol data unit (PPDU) structure using an explicit feedback method.

The communication apparatus transmits a beamforming announcement (BF-A) frame including feedback information to the STAs. For example, the communication apparatus may transmit, to the STAs, the BF-A frame including information, for example, an STA list, about STAs of which feedback information is required and classification information in which a plurality of subcarriers is classified into a plurality of frequency units. Here, the plurality of subcarriers may constitute a frequency band used for communication between the communication apparatus and the STAs.

The communication apparatus transmits, to the STAs, a beamforming training (BF-T) frame for estimating multiple antenna channels. The BF-T frame includes a pre-high efficiency WLAN (HEW) modulated field transmitted in a non-beamformed state and a HEW modulated field transmitted in a beamformed state. The communication apparatus determines a beamforming matrix based on the classification information and transmits the BF-T frame by mapping the determined beamformed matrix to the HEW modulated field.

Each STA determines a reception strength of the BF-T frame for each frequency unit. The STA may verify the plurality of frequency units classified from the plurality of subcarriers based on the classification information. The STA may determine feedback information based on a reception strength of the BF-T) frame, and may sequentially transmit HEW-feedback information (FBInFo) including the feedback information to the communication apparatus.

When a channel information exchange duration and a data transmission duration do not belong to the same transmit opportunity (TxOP), the communication apparatus may transmit a request to send (RTS) frame to each of the STAs and may receive a clear to send (CTS) frame from each of the STAs in response to the RTS frame. The communication apparatus may transmit data frames, for example, DATA1, DATA2, and DATA3, desired to be transmitted to the STAs. Each of the STAs having received the data frames may transmit a block acknowledgement (BA) frame.

Figure 3:
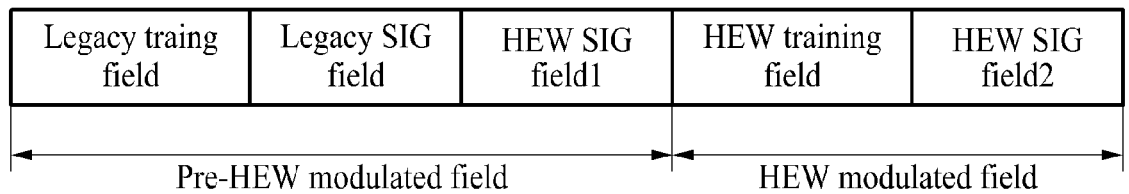
FIG. 3 illustrates an example of a beamforming training (BF-T) frame in a physical protocol data unit (PPDU) structure transmitted from a communication apparatus according to an embodiment.

FIG. 3 illustrates an example of a BF-T frame in a PPDU structure transmitted from a communication apparatus according to an embodiment.

The BF-T frame in the PPDU structure includes a pre-HEW modulated field transmitted in a non-beamformed state and a HEW modulated field transmitted in a beamformed state. The pre-HEW modulated field may indicate a portion transmitted in a non-beamformed state to be receivable at an STA that performs communication through 802.11a/n/ac. The HEW modulated field may indicate a portion transmitted by applying a beamforming matrix according to an STA that receives the BF-T frame.

The pre-HEW modulated field includes a legacy training field, a legacy signal (SIG) field, and a HEW SIG field 1. The legacy training field and the legacy SIG field may include information for a legacy STA capable of receiving a NON_HT format. The HEW SIG field 1 may include information about a configuration of a long training field (LTF) included in a HEW training field and classification information about a frequency unit included in a BF-A frame.

The HEW modulated field includes a HEW training field and a HEW SIG field 2. The HEW training field may include a short training field (STF) and an LTF sequence including at least one LTF. The STF may include information about an automatic gain control (AGC) and signal detection, and the LTF may include information about a channel estimation of an STA and a frequency error estimation.

Hereinafter, a process of transmitting a HEW training field will be described with reference to FIG. 4.

Figure 4:
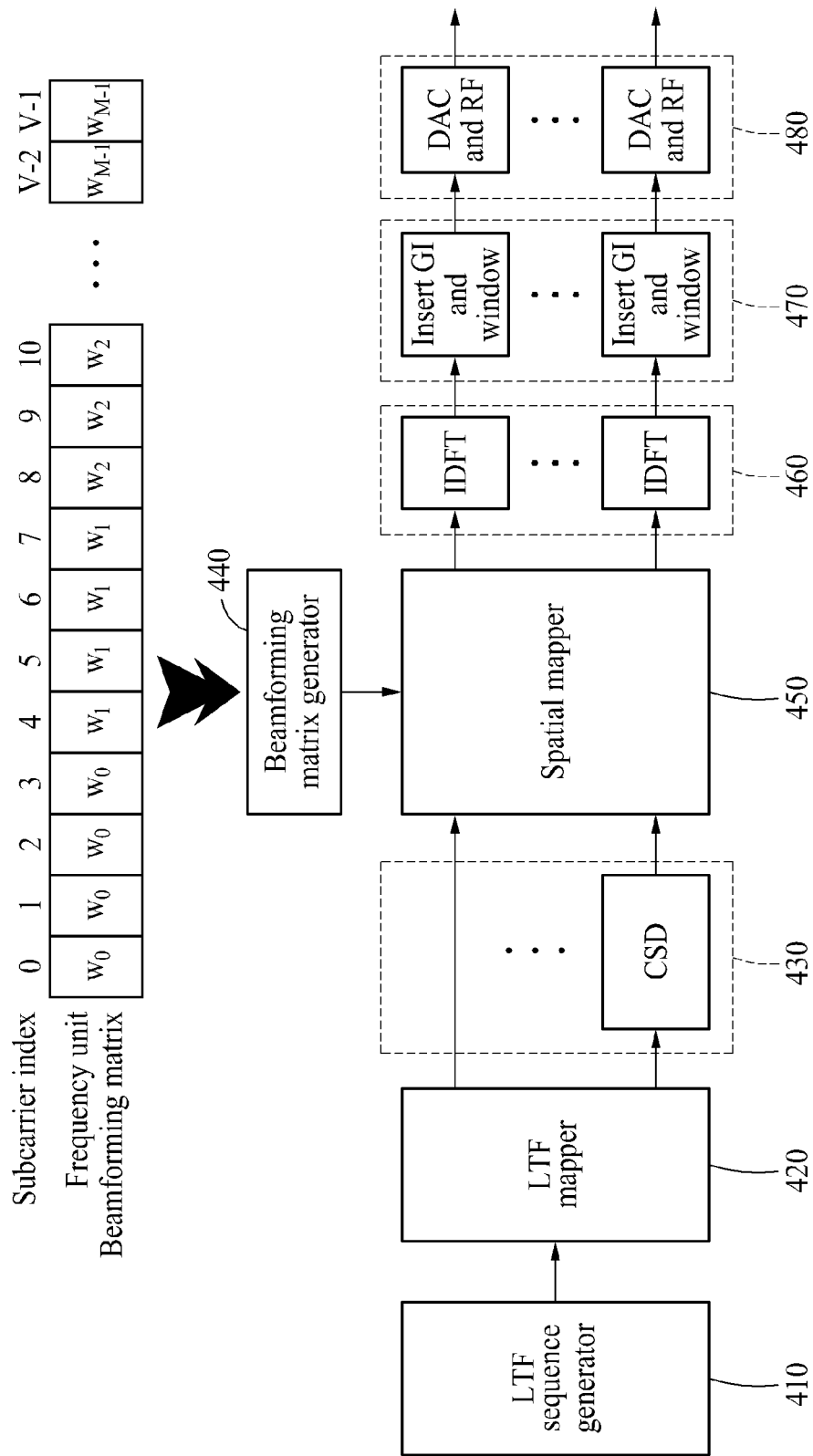
FIG. 4 illustrates a process of a communication apparatus transmitting a high efficiency wireless local area network (WLAN) (HEW) training field of a BF-T frame according to an embodiment.

FIG. 4 illustrates a process of a communication apparatus transmitting a HEW training field of a BF-T frame according to an embodiment.

An LTF sequence generator 410 may generate an LTF sequence based on a bandwidth for transmitting BF-T frame. The LTF sequence may include at least one LTF. An LTF mapper 420 may output the LTF sequence for each stream according to a transmit antenna of the communication apparatus by mapping the LTF sequence to a mapping code that is determined based on the number of symbols and the number of transmission streams $N_{sts}$. Here, $N_{sts}$ denotes the number of space time streams. In operation 430, a cyclic shift delay (CSD) may be applied to the LTF sequence output for each stream according to the transmit antenna. The LTF sequence may be transferred to a spatial mapper 450.

V subcarriers used for communication between the communication apparatus and STAs may be classified into M frequency units. Here, a beamforming matrix generator 440 may determine a beamforming matrix $W_m$ based on classification information in which the V subcarriers are classified into the M frequency units. In detail, the beamforming matrix generator 440 may determine the same beamforming matrix to be applied to subcarriers corresponding to the same frequency unit. For example, subcarriers 0 through 3 may be determined to correspond to the same frequency unit 0 and accordingly, the same beamforming matrix $W_0$ may be applied to the subcarriers 0 through 3. Accordingly, the beamforming matrix generator 440 may determine the beamforming matrix regardless of channel information between the communication apparatus and STAs.

The spatial mapper 450 may map the LTF sequence transferred from the CSD to the beamforming matrix determined by the beamforming matrix generator 440. In operation 460, an inverse discrete Fourier transform (IDFT) may be applied to the LTF sequence to which the beamforming matrix is mapped. In operation 470, guard interval (GI) inserting/windowing may be processed on the LTF sequence. In operation 480, digital-to-analog conversion (DAC) may be performed on the LTF sequence and thereby, the LTF sequence may be transmitted to an STA through a radio frequency (RF).

Figure 5:
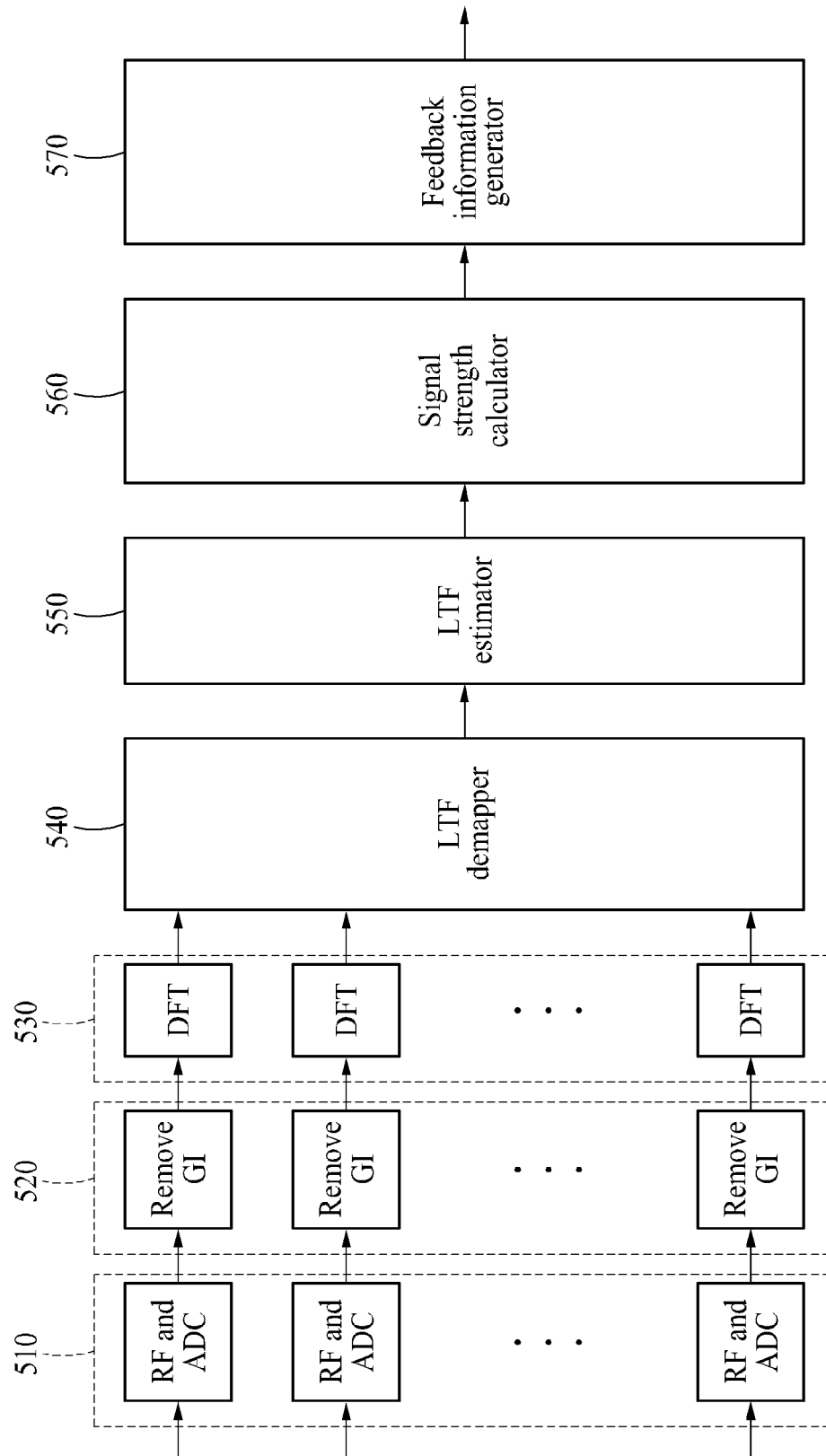
FIG. 5 illustrates a process of an STA receiving a HEW training field of a BF-T frame according to an embodiment.

FIG. 5 illustrates a process of an STA receiving a HEW training field of a BF-T frame according to an embodiment.

In operation 510, analog-to-digital (ADC) may be performed on a signal, for example, an LTF sequence included in a HEW training field, received at the STA. In operation 520, a GI may be removed from the LTF sequence. In operation 530, a discrete Fourier transform (DFT) may be applied to the LTF sequence and thereby, the LTF sequence may be transferred to an LTF demapper 540.

The LTF demapper 540 may perform LTF demapping of the LTF sequence input for each stream according to a transmit antenna of the communication apparatus. An LTF estimator 550 may perform a channel estimation using the LTF-demapped LTF sequence.

A signal strength calculator 560 calculates a reception strength of a BF-T frame using the channel estimation. The signal strength calculator 560 may determine the reception signal of a BF-T frame for each frequency unit. The signal strength calculator 560 may also determine the reception strength of the BF-T frame for each transmission stream received from the communication apparatus.

The signal strength calculator 560 may calculate a signal-to-interference and noise ratio (SINR), a signal to noise ratio (SNR), or a modulation and coding scheme (MCS) as the reception strength of the BF-T frame. For example, when the SINR is calculated as the reception strength of the BF-T frame, the signal strength calculator 560 may calculate an SINR, an SNR, or an MCS of the BF-T frame for each frequency unit.

A feedback information generator 570 may generate feedback information based on the reception strength of the BF-T frame determined by the signal strength calculator 560. The generated feedback information may be included in HEW-FBInfo and thereby transmitted to the communication apparatus.

Figure 6:
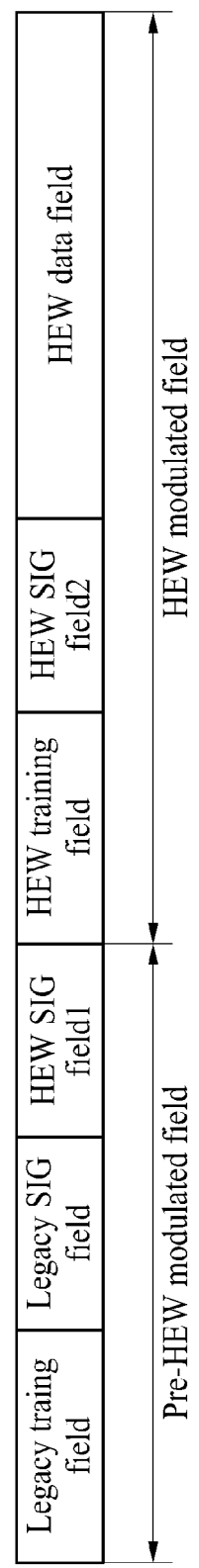
FIGS. 6 and 7 illustrate examples of a data frame in a PPDU structure transmitted from a communication apparatus according to an embodiment.
Figure 7:
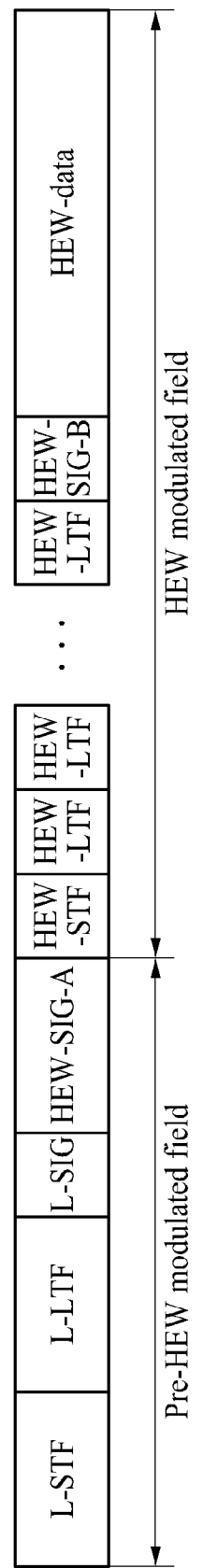

FIGS. 6 and 7 illustrate examples of a data frame in a PPDU structure transmitted from a communication apparatus according to an embodiment.

Referring to FIG. 6, the data frame in the PPDU structure includes a pre-HEW modulated field transmitted in a non-beamformed state and a HEW modulated field transmitted in a beamformed state. The pre-HEW modulated field may indicate a portion transmitted in a non-beamformed state to be receivable at an STA that performs communication through 802.11a/n/ac. The HEW modulated field may indicate a portion transmitted by applying a beamforming matrix according to an STA that receives the data frame.

For example, the data frame of FIG. 6 may indicate a data frame in a HEW PPDU structure of FIG. 7. A legacy SIG field of FIG. 6 may correspond to an L-SIG field of FIG. 7, a HEW SIG field 1 of FIG. 6 may correspond to a HEW-SIG-A field of FIG. 7, and a HEW SIG field 2 of FIG. 6 may correspond to a HEW-SIG-B field of FIG. 7.

FIG. 8 illustrates an example of a frequency unit allocated to an STA according to an embodiment.

A communication apparatus may allocate a frequency unit to data frames desired to be transmitted based on feedback information included in HEW-FBInfo received from STAs.

The communication apparatus may verify, for each data frame, a frequency unit having the highest reception strength among the plurality of frequency units based on the feedback information and may allocate the verified frequency unit to a corresponding data frame. Accordingly, when two or more data frames are to be transmitted to the same STA, the communication apparatus may verify, for each data frame, a frequency unit having a relatively high reception strength among the plurality of frequency units, and may allocate different frequency units to the data frames, respectively. For example, the communication apparatus may determine at least one frequency unit having the reception strength greater than a preset threshold strength among the plurality of frequency units, as a frequency unit having a relatively high reception strength among the plurality of frequency units.

FIG. 8 illustrates a frequency unit allocated to data frames according to an embodiment. FIG. 8 illustrates an example of a frequency unit allocated when a communication apparatus transmits three data frames to two STAs. It may be represented as the following Table 1.

TABLE 1

| Data frame | Frequency unit index |
|---|---|
| Data frame 1 | 0, 2, 7, 8, 10, 11, 14, 15 |
| Data frame 2-1 | 3, 4, 7, 9, 13 |
| Data frame 2-2 | 1, 2, 4, 5, 6, 9, 10, 11 |

Referring to Table 1, the data frame 1 indicates a data frame to be transmitted to an STA 1, the data frame 2-1 indicates a first data frame to be transmitted to an STA 2, and the data frame 2-2 indicates a second data frame to be transmitted to the STA 2. As shown in Table 1, the communication apparatus may also allocate the same frequency unit to different data frames based on feedback information.

For example, the communication apparatus may determine allocation information about a frequency unit allocated to data frames for each data frame as expressed by the following Table 2.

TABLE 2

| Data frame | Allocation information about frequency unit |
|---|---|
| Data frame 1 | 1010_0001_1011_0011 |
| Data frame 2-1 | 0001_1001_0100_0100 |
| Data frame 2-2 | 0110_1110_0111_0000 |

In allocation information of Table 2, "1" denotes that a frequency unit is allocated to a corresponding data frame and "0" indicates that a frequency unit is not allocated to the corresponding data frame.

For example, allocation information of the data frame 1 may include {1010_0001_1011_0011}. A first bit value "1" of the allocation information may indicate that a frequency unit 0 that is a first frequency unit is allocated to the data frame 1, and a second bit value "0" may indicate that a frequency unit 1 is not allocated to the data frame 1.

Similarly, allocation information of the data frame 2-1 may include {0001_1001_0100_0100}, and allocation information of the data frame 2-2 may include {0110_1110_0111_0000}.

As another example, the communication apparatus may also determine allocation information about a frequency unit allocated to data frames for each frequency unit. When representing allocation information according to FIG. 8 for each frequency unit, allocation information may include {100_001_101_010_011_001_001_110_100_011_101_101_000_010_100_100}.

As another example, the communication apparatus may also determine allocation information about a frequency unit allocated to data frames for each STA. That is, when transmitting data frames to a specific STA through a plurality of transmission streams, allocation information about a frequency unit allocated to the data frames may be combined. For example, when representing allocation information of FIG. 8 for each STA, allocation information of the STA 1 may include {1010_0001_1011_0011} and allocation information of the STA 2 may include {0111_1111_0111_0100}.

Although the description is made based on an embodiment in which allocation information is determined for each data frame, for each frequency unit, or for each STA, the description is not to limit or restrict embodiments of allocation information determined by the communication apparatus. In addition to the aforementioned methods, the communication apparatus may determine allocation information about a frequency unit allocated to data frames using a variety of methods.

The communication apparatus may transmit allocation information to an STA. For example, the communication apparatus may transmit allocation information to an STA by including the allocation information in HEW-SIG-A of a pre-HEW modulated field. As another example, the communication apparatus may transmit allocation information to an STA by including the allocation information in HEW-SIG-B of a HEW modulated field. A process of transmitting allocation information from the communication apparatus to the STA will be described with reference to FIGS. 9 through 12.

Figure 9:
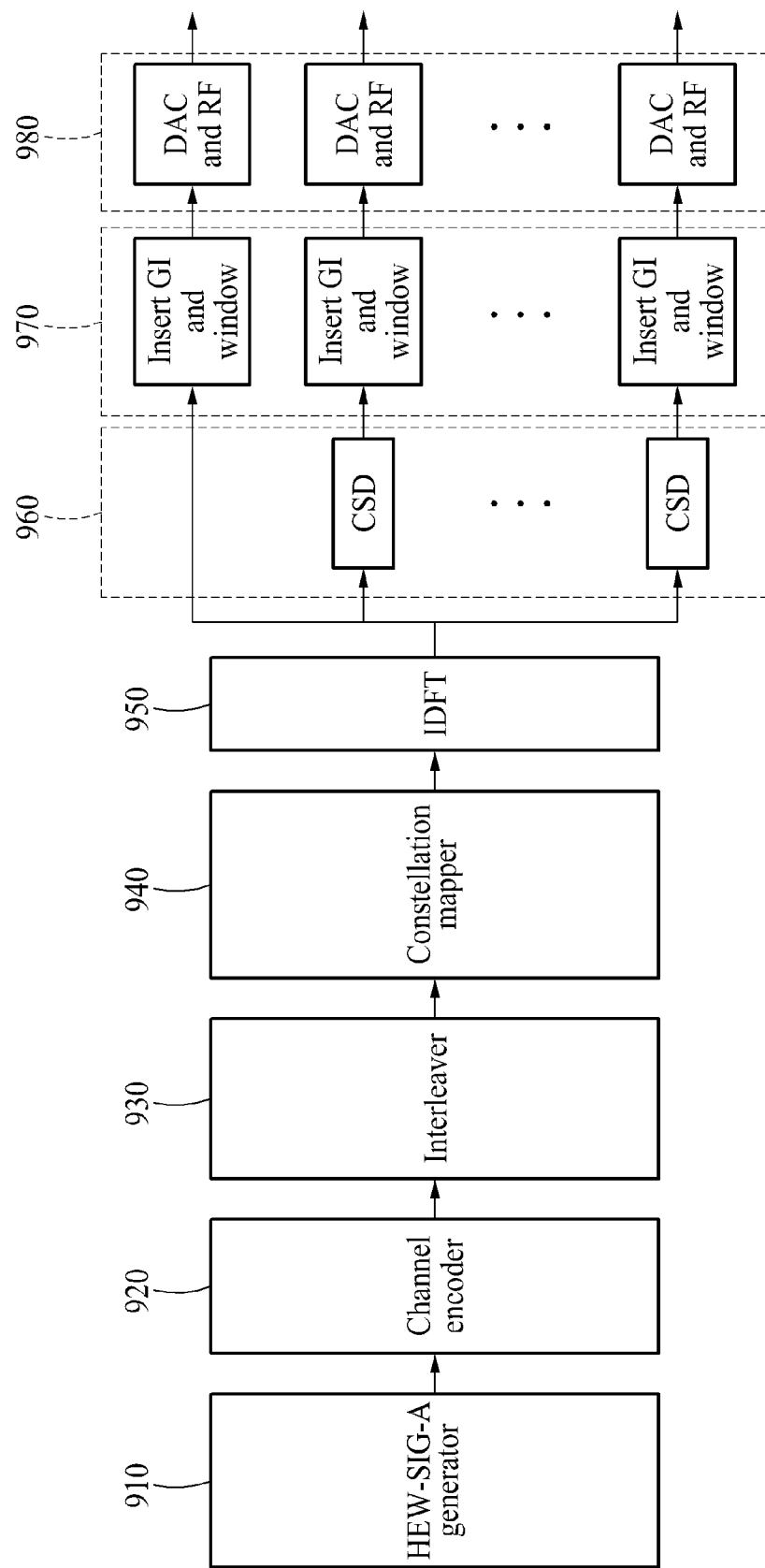
FIG. 9 illustrates a process of a communication apparatus transmitting HEW-SIG-A according to an embodiment.

FIG. 9 illustrates a process of a communication apparatus transmitting HEW-SIG-A according to an embodiment.

The communication apparatus according to an embodiment may transmit allocation information to an STA by including the allocation information in HEW-SIG-A of a pre-HEW modulated field. Here, the allocation information may be information for each data frame, information for each frequency unit, or information for each STA. Allocation information to be included in the HEW-SIG-A may include allocation information about a frequency unit allocated to data frames to be transmitted from the communication apparatus.

In detail, a HEW-SIG-A generator 910 of the communication apparatus may generate HEW-SIG-A including allocation information.

A channel encoder 920 may perform channel encoding of HEW-SIG-A. An interleaver 930 may interleave the channel-encoded HEW-SIG-A. A constellation mapper 940 may modulate the interleaved HEW-SIG-A using a variety of modulation methods, for example, binary phase shift keying (BPSK), quadrature phase shift keying (QPSK), 16 quadrature amplitude modulation (16QAM), 64QAM, 128QAM, 256QAM, 512QAM, and 1024QAM. In operation 950, an IDFT may be applied to the modulated HEW-SIG-A. In operation 960, a CSD may be applied to the HEW-SIG-A. Further, in operation 970, GI inserting/windowing may be processed on the HEW-SIG-A. In operation 980, DAC may be performed on the HEW-SIG-A and thereby, the HEW-SIG-A may be transmitted to an STA through an RF.

Figure 10:
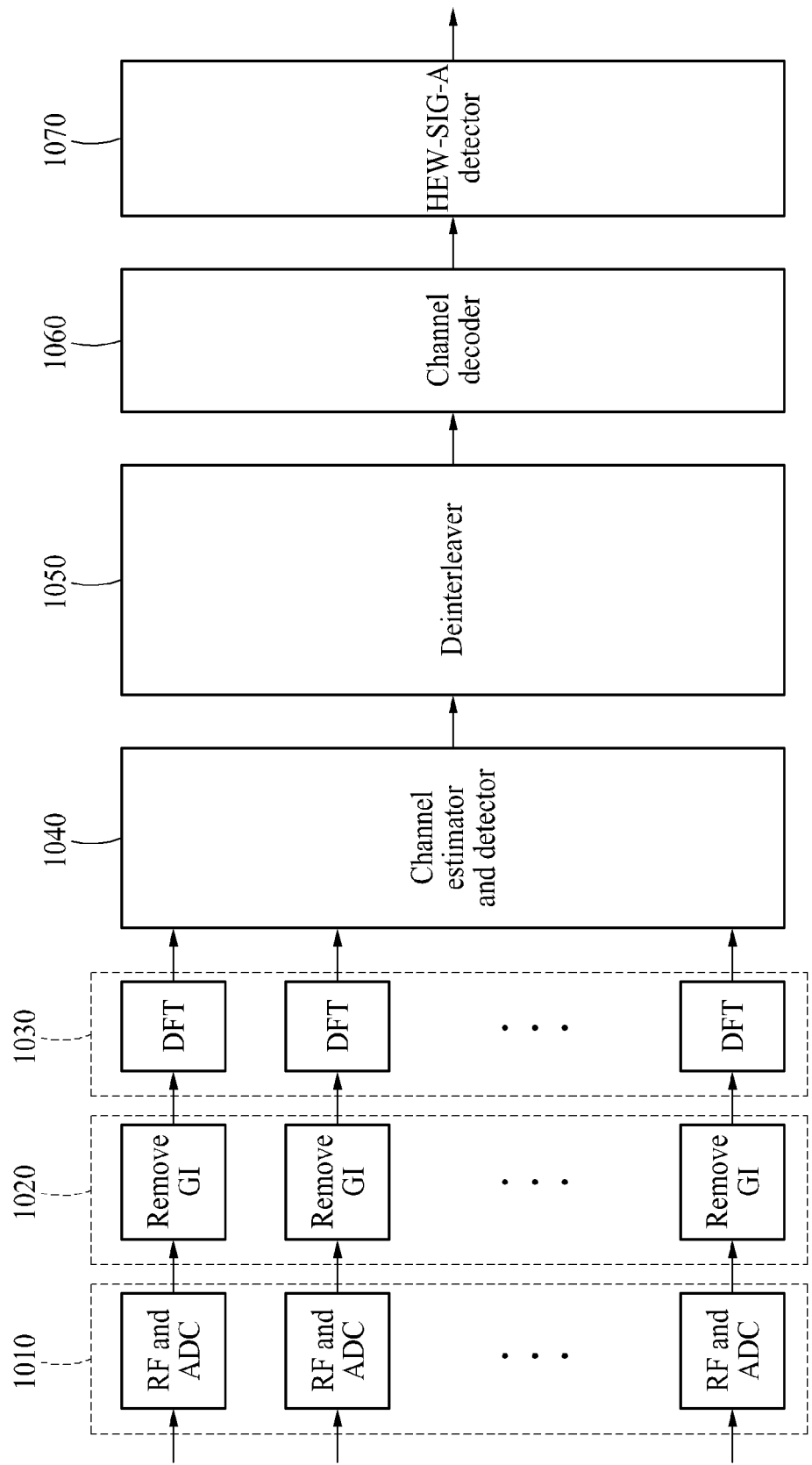
FIG. 10 illustrates a process of an STA receiving HEW-SIG-A according to an embodiment.

FIG. 10 illustrates a process of an STA receiving HEW-SIG-A according to an embodiment.

In operation 1010, ADC may be performed on HEW-SIG-A received at an STA. In operation 1020, a GI may be removed from the HEW-SIG-A. In operation 1030, a DFT may be applied to the HEW-SIG-A and thereby, the HEW-SIG-A may be transferred to a channel estimator and detector 1040.

The channel estimator and detector 1040 may perform channel estimation using an LTF and may detect a signal. When a plurality of receive antennas is present at the STA, the channel estimator and detector 1040 may also combine the detected signals.

A deinterleaver 1050 may deinterleave the detected signal. A channel decoder 1060 may perform channel decoding of the deinterleaved signal. A HEW-SIG-A detector 1070 may determine allocation information included in the HEW-SIG-A transmitted from the communication apparatus using the channel-decoded signal.

The STA may demodulate HEW-data and HEW-SIG-B received from the communication apparatus based on the allocation information.

Figure 11:
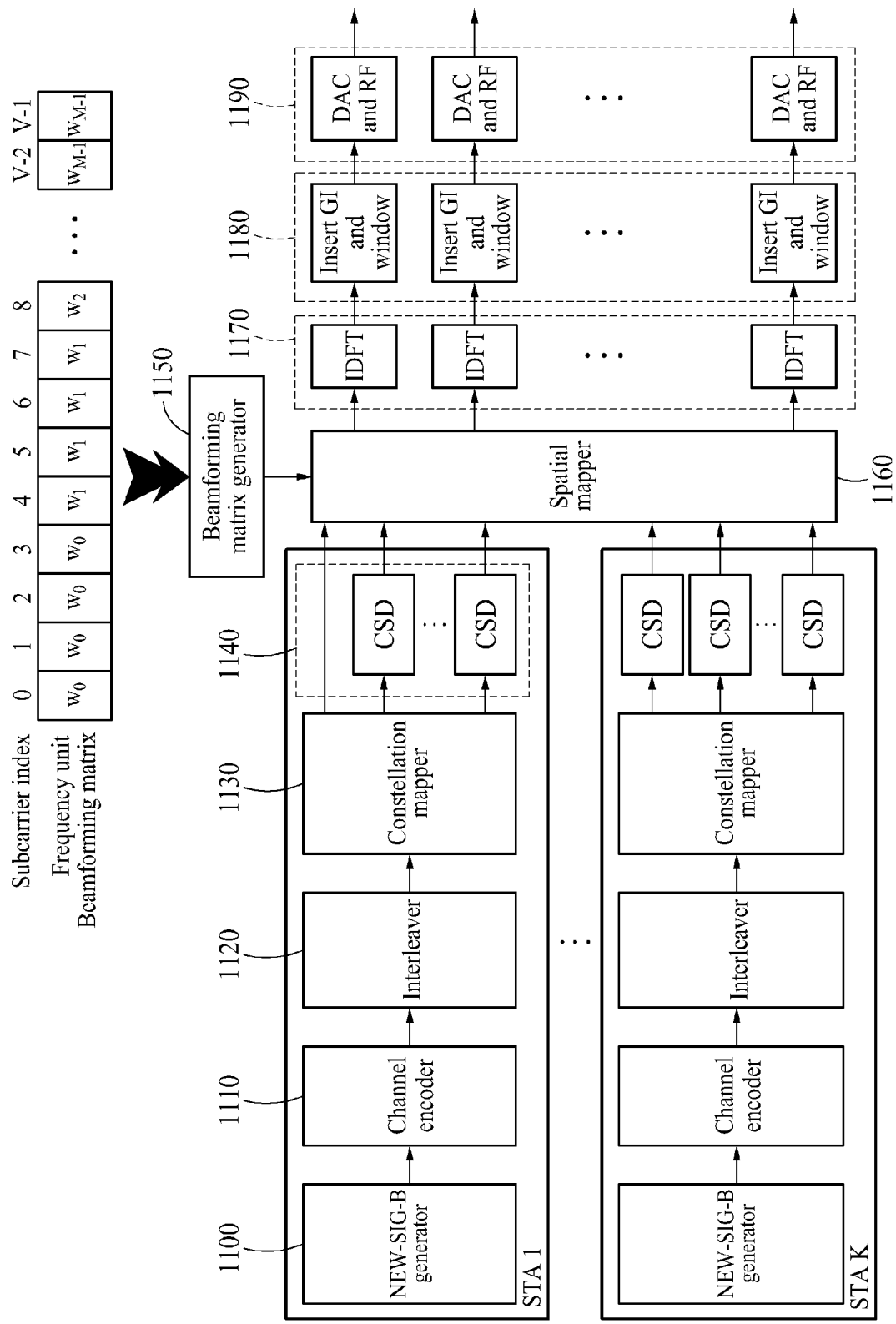
FIG. 11 illustrates a process of a communication apparatus transmitting HEW-SIG-B according to an embodiment.

FIG. 11 illustrates a process of a communication apparatus transmitting HEW-SIG-B according to an embodiment.

The communication apparatus according to an embodiment may transmit allocation information to an STA by including the allocation information in HEW-SIG-B of a HEW modulated field. Here, the HEW-SIG-B included in the HEW modulated field may include different information for each STA. The allocation information to be included in the HEW-SIG-B may include allocation information corresponding to a specific STA that receives the HEW modulated field.

Hereinafter, a description will be made based on a process of transmitting corresponding HEW-SIG-B to one of STAs will be described with reference to FIG. 11. It is only for conciseness and thus, the embodiment may be applicable to an example of transmitting corresponding HEW-SIG-B to another STA.

In detail, a HEW-SIG-B generator 1100 of the communication apparatus may generate HEW-SIG-B corresponding to STA1. The HEW-SIG-B generated by the HEW-SIG-B generator 1100 may include allocation information about a frequency unit allocated to a data frame received at the STA1.

For example, when frequency units as shown in FIG. 8 are assumed to be allocated, the HEW-SIG-B generator 1100 may generate HEW-SIG-B including allocation information of {1010_0001_1011_0011}. Another HEW-SIG-B generator may generate HEW-SIG-B corresponding to STA2. For example, the other HEW-SIG-B generator may generate HEW-SIG-B including allocation information of {0001_1001_0100_0100} and {0110_1110_0111_0000}. Here, {0001_1001_0100_0100} may indicate a frequency unit allocated to a data frame 2-1 to be transmitted to STA2, and {0110_1110_0111_0000} may indicate a frequency unit allocated to a data frame 2-2 to be transmitted to STA2.

A channel encoder 1110 may perform channel encoding of the HEW-SIG-B. An interleaver 1120 may interleave the channel-encoded HEW-SIG-B. A constellation mapper 1130 may modulate the interleaved HEW-SIG-B using a variety of modulation methods, for example, BPSK, QPSK, 16QAM, 64QAM, 128QAM, 256QAM, 512QAM, and 1024QAM. In operation 1140, a CSD may be applied to the modulated HEW-SIG-B and thereby, the HEW-SIG-B may be transferred to a spatial mapper 1160.

A beamforming matrix generator 1150 may generate a beamforming matrix based on allocation information. For example, the beamforming matrix generator 1150 may include a plurality of beamforming matrices corresponding to a plurality of frequency units. The beamforming matrix generator 1150 may verify a frequency unit allocated to a data frame including HEW-SIG-B, and may select a beamforming matrix corresponding to the frequency unit allocated to the data frame from among the plurality of beamforming matrices.

The spatial mapper 1160 may map the HEW-SIG-B transferred from the CSD to the beamforming matrix determined by the beamforming matrix generator 1150. In this instance, the spatial mapper 1160 may map the HEW-SIG-B to the beamforming matrix corresponding to the frequency unit allocated to the corresponding data frame.

In operation 1170, an IDFT may be applied to the HEW-SIG-B to which the beamforming matrix is mapped. In operation 1180, GI inserting/windowing may be performed on the HEW-SIG-B. In operation 1190, DAC may be performed on the HEW-SIG-B and thereby, the HEW-SIG-B may be transmitted to an STA through an RF.

Figure 12:
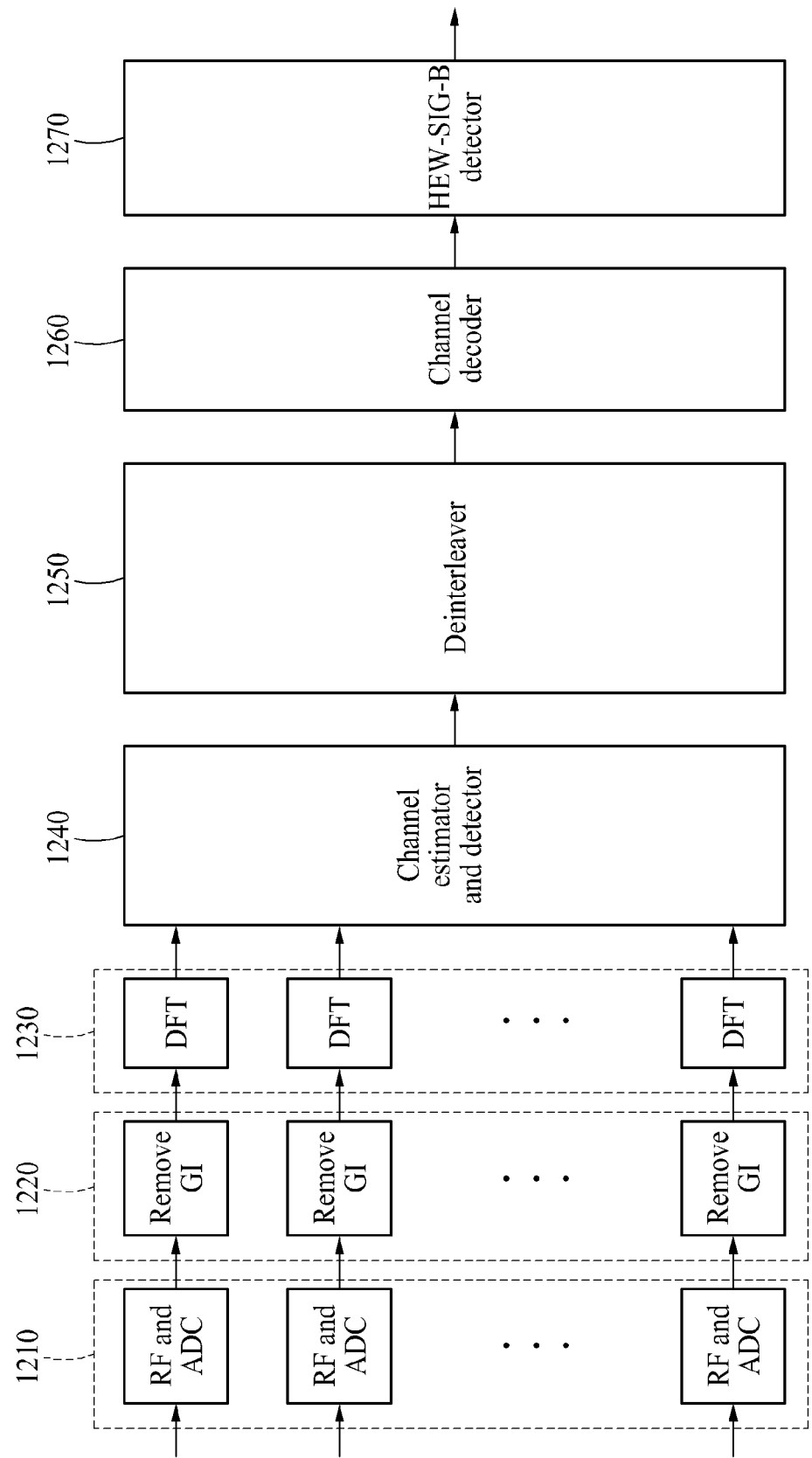
FIG. 12 illustrates a process of an STA receiving HEW-SIG-B according to an embodiment.

FIG. 12 illustrates a process of an STA receiving HEW-SIG-B according to an embodiment.

In operation 1210, ADC may be performed on HEW-SIG-B received at an STA. In operation 1220, a GI may be removed from the HEW-SIG-B. In operation 1230, a DFT may be applied to the HEW-SIG-B and thereby, the HEW-SIG-B may be transferred to a channel estimator and detector 1240.

The channel estimator and detector 1240 may perform channel estimation using an LTF and may detect the HEW-SIG-B. A deinterleaver 1250 may deinterleave the detected HEW-SIG-B. In detail, the deinterleaver 1250 may perform deinterleaving based on a bit repetition included in the detected HEW-SIG-B. A channel decoder 1260 may perform channel decoding of the deinterleaved HEW-SIG-B. A HEW-SIG-B detector 1270 may determine allocation information included in the HEW-SIG-B that is transmitted from the communication apparatus, using the channel-decoded HEW-SIG-B. The HEW-SIG-B detector 1270 may verify allocation information corresponding to the STA from the HEW-SIG-B.

The STA may demodulate HEW-Data received from the communication apparatus based on the allocation information.

Figure 13:
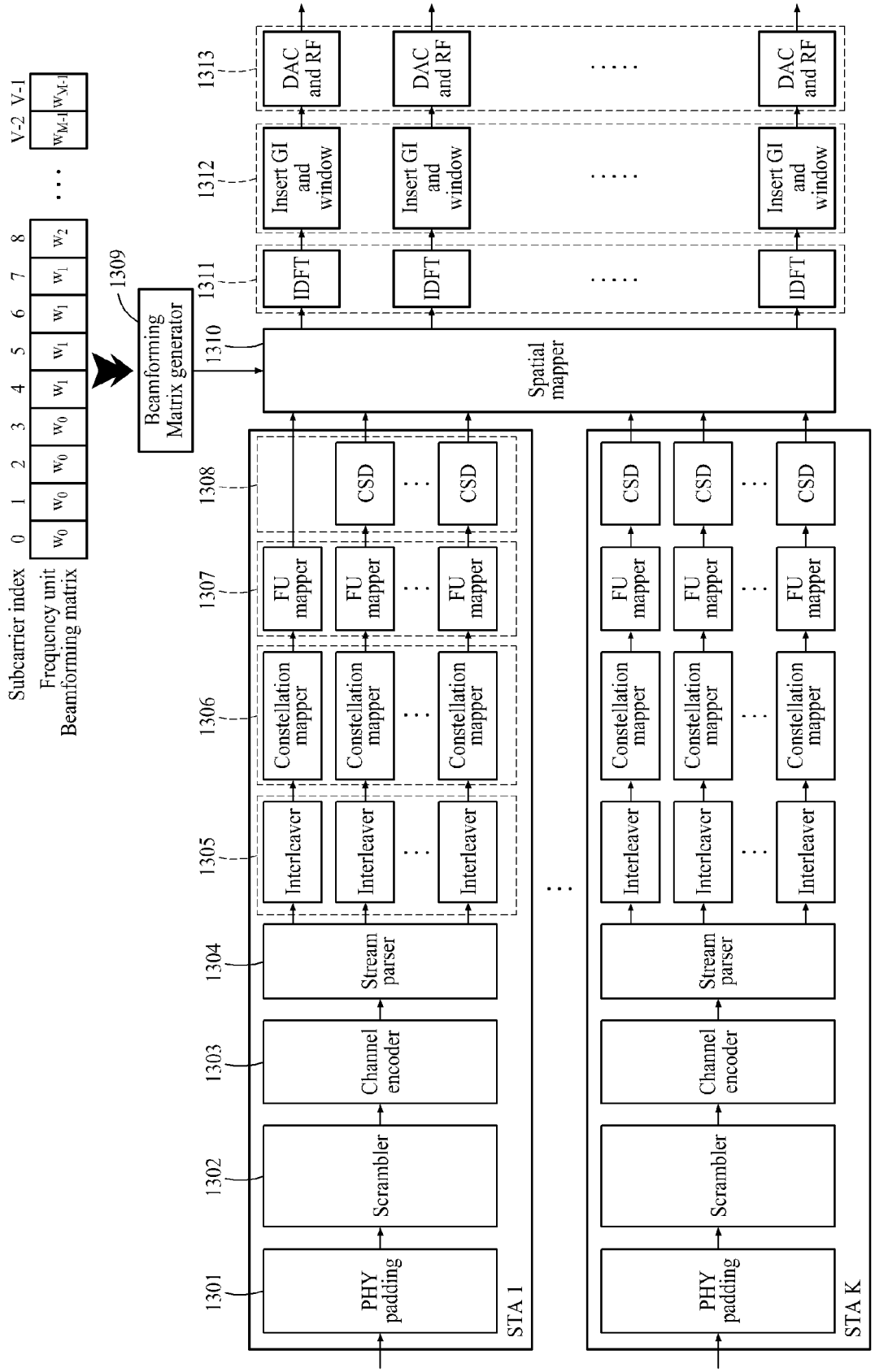
FIG. 13 illustrates a process of a communication apparatus transmitting HEW-Data according to an embodiment.

FIG. 13 illustrates a process of a communication apparatus transmitting HEW-Data according to an embodiment.

The communication apparatus according to an embodiment may transmit data to a corresponding STA by including, in HEW-Data, data desired to be transmitted to each STA. The communication apparatus may process data to be transmitted in a PHY layer.

A description will be made based on a process of transmitting HEW-Data to be transmitted to one of a plurality of STAs will be described with reference to FIG. 13. It is only for conciseness and thus, the embodiment may be applicable to an example of transmitting HEW-Data to another STA.

In detail, a PHY padder 1301 may apply PHY padding to HEW-Data to be transmitted from the communication apparatus. A scrambler 1302 may scramble the PHY-padded HEW-Data. A channel encoder 1303 may perform channel encoding of the scrambled HEW-Data. A stream parser 1304 may separate the channel-encoded HEW-Data by the number of transmission streams to be transmitted to a corresponding STA. An interleaver 1305 may interleave HEW-Data separated for each transmission stream. A constellation mapper 1306 may modulate the interleaved HEW-Data using a variety of modulation methods, for example, BPSK, QPSK, 16QAM, 64QAM, 128QAM, 256QAM, 512QAM, and 1024QAM.

A frequency unit (FU) mapper 1307 may map the modulated HEW-Data to a subcarrier according to allocation information. Information about frequency units allocated to corresponding HEW-Data may be included in allocation information. The FU mappers 1307 may map corresponding HEW-Data to subcarriers corresponding to allocated frequency units. Although the FU mapper 1307 is located to be next to the constellation mapper 1306, the FU mapper 1307 may also be located to be next to the interleaver 1305 depending on embodiments. That is, various embodiments may be applicable to a location of the FU mapper 1307.

In operation 1308, CSD may be applied to HEW-Data mapped to the subcarrier and thereby, the HEW-Data may be transferred to a spatial mapper 1310.

A beamforming matrix generator 1309 may generate a beamforming matrix based on allocation information. The beamforming matrix generator 1309 may determine a beamforming matrix using a frequency unit allocated to a data frame including HEW-Data. For example, the beamforming matrix generator 1309 may include a plurality of beamforming matrices corresponding to a plurality of frequency units. The beamforming matrix generator 1309 may verify a frequency unit allocated to a data frame based on allocation information, and may select a beamforming matrix corresponding to the frequency unit allocated to the data frame from among the plurality of beamforming matrices.

The spatial mapper 1310 may map HEW-Data transferred from the CSD to the beamforming matrix determined by the beamforming matrix generator 1309. In this instance, the spatial mapper 1310 may map the HEW-Data to the beamforming matrix corresponding to the frequency unit allocated to the corresponding data frame.

In operation 1311, an IDFT may be applied to the HEW-Data mapped to the beamforming matrix. In operation 1312, GI inserting/windowing may be performed on the HEW-Data. In operation 1313, DAC may be performed on the HEW-Data and thereby, the HEW-Data may be transmitted to an STA through an RF.

Figure 14:
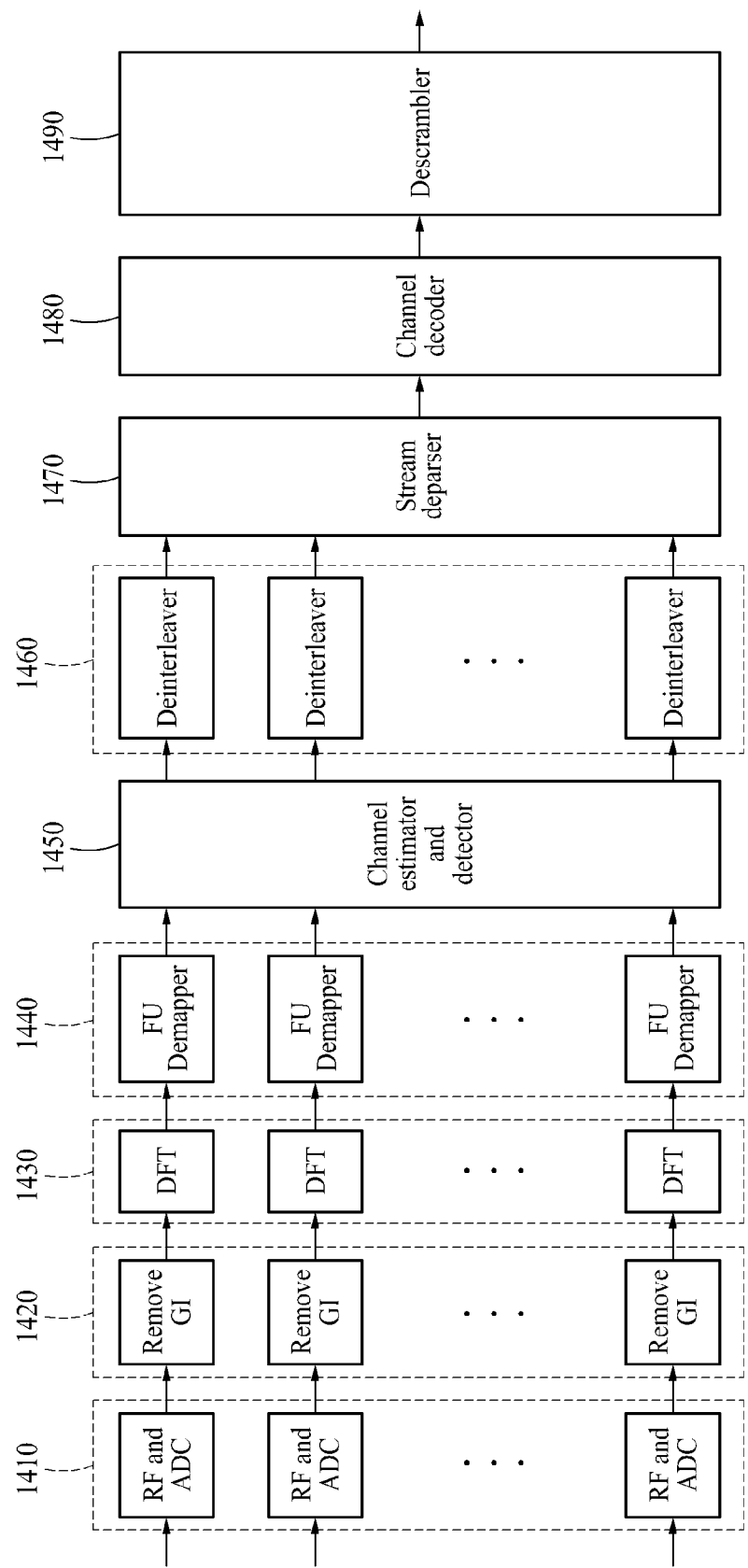
FIG. 14 illustrates a process of an STA receiving HEW-Data according to an embodiment.

FIG. 14 illustrates a process of an STA receiving HEW-Data according to an embodiment.

In operation 1410, ADC may be performed on HEW-Data received at an STA. In operation 1420, a GI may be removed from HEW-Data. In operation 1430, a DFT may be applied to the HEW-Data and thereby, the HEW-Data may be transferred to a FU demapper 1440.

The FU demapper 1440 may perform FU demapping of the HEW-Data based on allocation information received through HEW-SIG-A or HEW-SIG-B, and may transfer a result thereof to a channel estimator and detector 1450. The channel estimator and detector 1450 may perform channel estimation using an LTF and may detect the HEW-Data. A deinterleaver 1460 may deinterleave the detected HEW-Data. In detail, the deinterleaver 1460 may perform deinterleaving based on a bit repetition included in the detected HEW-Data. A stream deparser 1470 may combine streams received at a corresponding STA by applying stream deparsing to the deinterleaved HEW-Data. A channel decoder 1480 may perform channel decoding of the deparsed HEW-Data. A descrambler 1490 may descramble the channel-decoded HEW-Data and may transfer the descrambled HEW-Data to a media access control (MAC) layer that is an upper layer.

Figure 15:
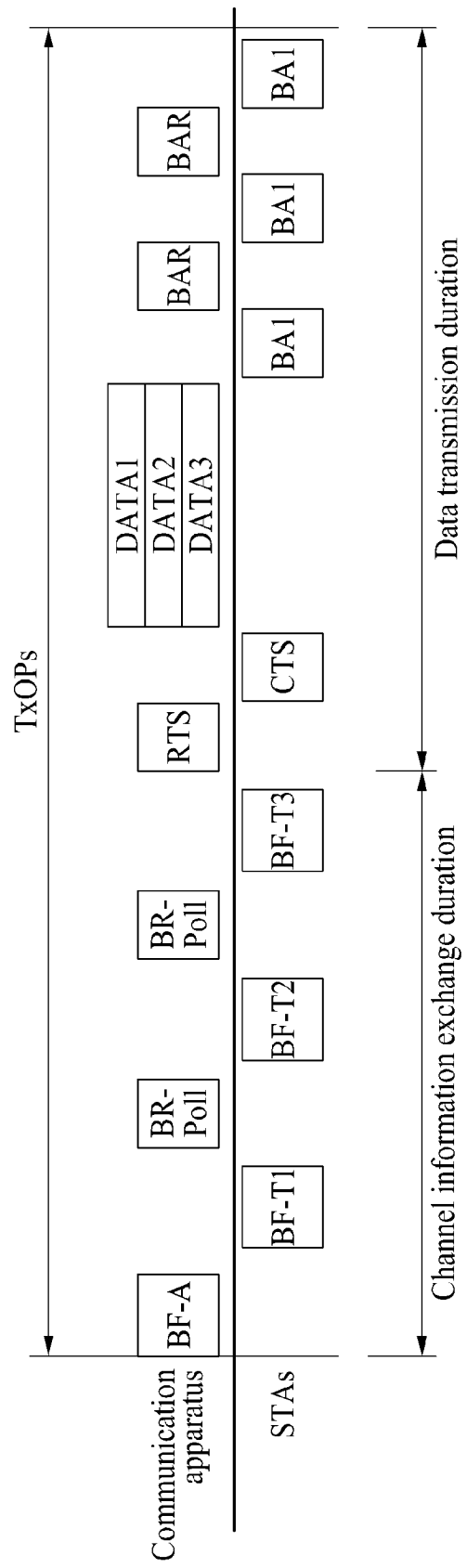
FIG. 15 illustrates a communication method using an implicit feedback method according to an embodiment.

FIG. 15 illustrates a communication method using an implicit feedback method according to an embodiment.

According to another embodiment, a communication apparatus and STAs may perform communication by exchanging frames in a PPDU structure using an implicit feedback method based on channel reciprocity.

The communication apparatus transmits a BF-A frame including feedback information to the STAs. For example, the communication apparatus may transmit, to the STAs, a BF-A frame including information, for example, an STA list, about STAs of which feedback information is required and classification information in which a plurality of subcarriers is classified into a plurality of frequency units.

The STAs may transmit, to the communication apparatus, a BF-T frame that is a PPDU for estimating multiple antenna channels. The BF-T frame includes a pre-HEW modulated field transmitted in a non-beamformed state and a HEW modulated field transmitted in a beamformed state.

The communication apparatus may determine a beamforming matrix for a multi-user transmission using the BF-T frame received from the STAs and may allocate frequency units to data frames to be transmitted to the STAs. The communication apparatus may transmit data frames, for example, DATA1, DATA2, and DATA3, using the determined beamforming matrix and the allocated frequency units.

When a channel information exchange duration and a data transmission duration do not belong to the same TxOP, the communication apparatus may transmit an RTS frame to the STAs and may receive a CTS frame from the STAs in response to the RTS frame. The communication apparatus may transmit, to the STAs, data frames, for example, DATA1, DATA2, and DATA3, to be transmitted.

The description made above with reference to FIGS. 1 through 14 may be applicable to a communication process of FIG. 15 and thus, a further detailed description will be omitted here.

Figure 16:
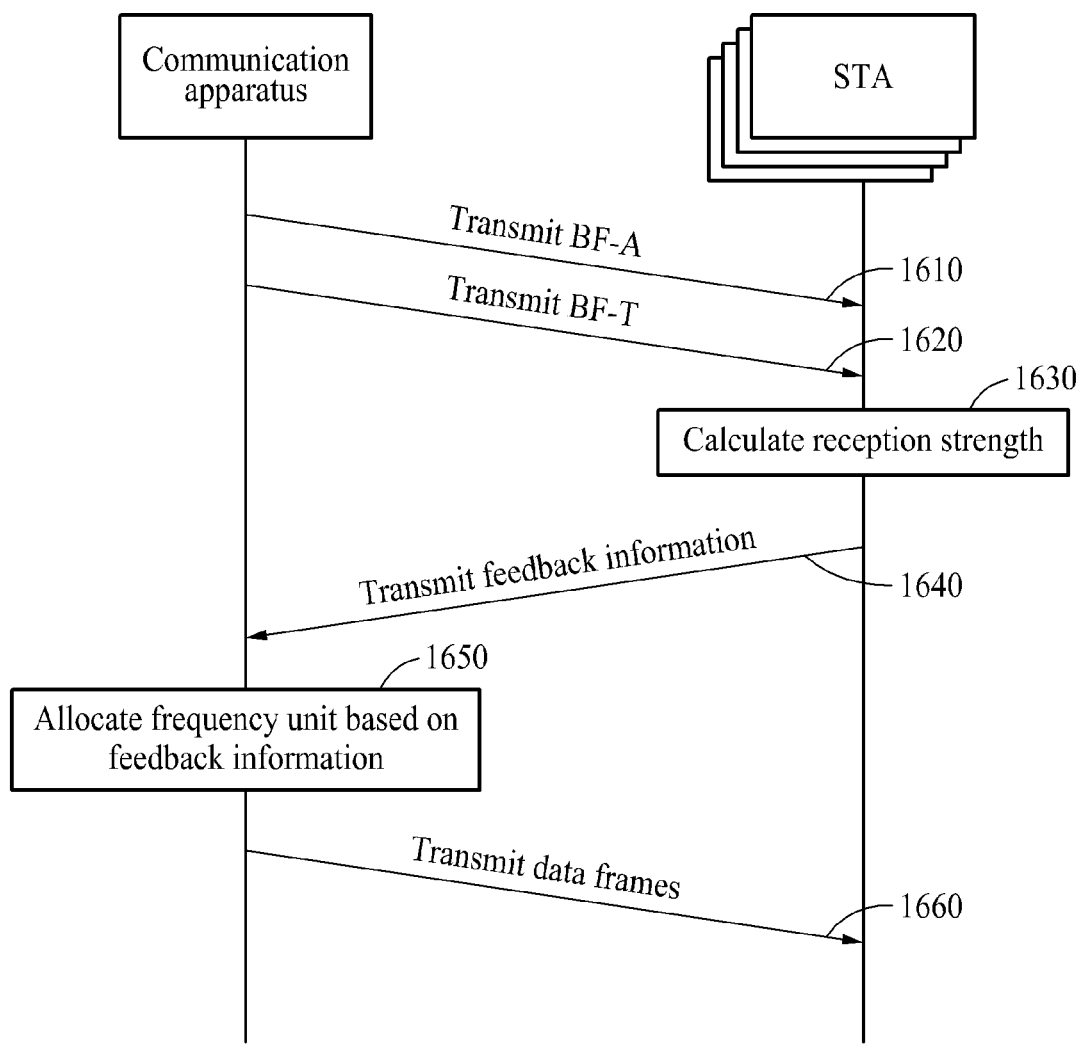
FIG. 16 illustrates a communication performed between a communication apparatus and an STA according to an embodiment.

FIG. 16 illustrates a communication performed between a communication apparatus and STAs according to an embodiment.

Operations of FIG. 16 may be performed by a processor included in the communication apparatus or the STAs. A frame exchange between the communication apparatus and STAs may be performed by a communicator included in the communication apparatus or the STAs.

In operation 1610, the communication apparatus transmits a BF-A frame including feedback information to STAs. For example, the communication apparatus may transmit, to the STAs, a BF-A frame including information, for example, an STA list, about STAs of which feedback information is required and classification information in which a plurality of subcarriers is classified into a plurality of frequency units.

In operation 1620, the communication apparatus transmits, to the STAs, a BF-T frame for estimating multiple antenna channels. The BF-T frame includes a pre-HEW modulated field transmitted in a non-beamformed state and a HEW modulated field transmitted in a beamformed state. The communication apparatus determines a beamforming matrix based on the classification information and transmits the BF-T frame by mapping the determined beamformed matrix to the HEW modulated field.

In operation 1630, each STA may determine a reception strength of the BF-T frame. The STA may verify the reception strength of the BF-T frame for each frequency unit. Each STA may determine the reception strength of the BF-T frame for each transmission stream received from the communication apparatus. For example, each STA may calculate an SINR, an SNR, or a MCS as the reception strength of the BF-T frame.

Each STA may generate feedback information based on the calculated reception strength of the BF-T frame. The generated feedback information may include information about an SINR, an SNR, or an MCS at a plurality of frequency units.

In operation 1640, each STA may transmit feedback information to the communication apparatus by including the feedback information in HEW-FBInfo.

In operation 1650, the communication apparatus may allocate frequency units based on feedback information included in HEW-FBInfo. The communication apparatus may allocate frequency units to data frames to be transmitted to the plurality of STAs based on the feedback information. For example, the communication apparatus may verify, for each data frame, at least one frequency unit having a reception strength greater than a preset threshold strength among the plurality of frequency units, based on the feedback information. The communication apparatus may allocate the verified at least one frequency unit to a corresponding data frame.

In operation 1660, the communication apparatus may transmit data frames using the allocated frequency units.

The description made above with reference to FIGS. 1 through 15 may be applicable to operations of FIG. 16 and thus, a further detailed description will be omitted here.

The embodiments described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for receiving feedback information by an access point (AP), the method comprising:
   transmitting, to at least one station (STA), an announcement frame including at least one STA information each indicating one of the at least one STA and at least one partial bandwidth information each indicating at least one frequency resource unit;
   transmitting, to the at least one STA, at least one training frame;
   transmitting, to the at least one STA, a polling frame; and
   receiving, from the at least one STA, feedback information for the at least one partial bandwidth information indicated by the announcement frame, wherein the feedback information is received in response to the polling frame; and
   transmitting, to the at least one STA, a multiple-user (MU) physical protocol data unit (PPDU) based on the feedback information.

2. The method according to claim 1,
   wherein the MU PPDU includes a HEW-SIG-A field and a HEW-SIG-B field, and HEW-SIG-B field includes frequency resource unit allocation information.

3. The method according to claim 2,
   wherein the frequency resource unit allocation information includes information indicating which subcarriers correspond to which frequency resource unit.

4. The method according to claim 3,
   wherein the frequency resource unit allocation information further includes information indicating which frequency resource unit is allocated to which STA.

5. The method according to claim 1,
   wherein feedback information from a first STA is received in response to a first polling frame, and
   feedback information from a second STA is received in response to a second polling frame.

6. The method according to claim 1,
   wherein each of the at least one training frame includes a first portion including a legacy training field, a legacy signal (SIG) field, a high efficiency wireless local area network (HEW) SIG field and a second portion including a HEW training field without a data field and fields after the HEW training field.

7. The method according to claim 6,
   wherein no beamforming is applied to a pre-HEW modulated fields corresponding to the first portion, and a beamforming is applied to HEW modulated fields corresponding to the second portion when a multiple-user multiple-input multiple-output (MU-MIMO) is applied to the HEW modulated fields.

8. The method according to claim 7,
   wherein a beamforming weight of each frequency unit having a bandwidth less than 20 MHz is differently set in the second portion.

9. A method for transmitting feedback information by a station (STA), the method comprising:
   receiving, from an access point (AP), an announcement frame including at least one STA information each indicating one of the at least one STA including the STA and at least one partial bandwidth information each indicating at least one frequency resource unit;
   receiving, from the AP, at least one training frame;
   receiving, from the AP, a polling frame; and
   transmitting, to the AP, feedback information for the at least one partial bandwidth information indicated by the announcement frame, wherein the feedback information is received in response to the polling frame, and
   receiving, from the AP, a multiple-user (MU) physical protocol data unit (PPDU) based on the feedback information.

10. The method according to claim 9,
wherein the MU PPDU includes a HEW-SIG-A field and a HEW-SIG-B field and the HEW-SIG-B field includes frequency resource unit allocation information.

11. The method according to claim 10,
wherein the frequency resource unit allocation information includes information indicating which subcarriers correspond to which frequency resource unit.

12. The method according to claim 11,
wherein the frequency resource unit allocation information further includes information indicating which frequency resource unit is allocated to which STA.

13. The method according to claim 9,
wherein feedback information from a first STA is received in response to a first polling frame, and
feedback information from a second STA is received in response to a second polling frame.

14. The method according to claim 9,
wherein each of the at least one training frame includes a first portion including a legacy training field, a legacy signal (SIG) field, a high efficiency wireless local area network (HEW) SIG field and a second portion including a HEW training field without a data field and fields after the HEW training field.

15. The method according to claim 14,
wherein no beamforming is applied to a pre-HEW modulated fields corresponding to the first portion, and a beamforming is applied to HEW modulated fields corresponding to the second portion when a multiple-user multiple-input multiple-output (MU-MIMO) is applied to the HEW modulated fields.

16. The method according to claim 15,
wherein a beamforming weight of each frequency unit having a bandwidth less than 20 MHz is differently set in the second portion.

17. An apparatus of an access point (AP) for receiving feedback information, the apparatus comprising:
a communicator; and
a processor;
wherein the processor is configured to:
cause the communicator to transmit, to at least one station (STA), an announcement frame including at least one STA information each indicating one of the at least one STA and at least one partial bandwidth information each indicating at least one frequency resource unit,
cause the communicator to transmit, to the at least one STA, a training frame,
cause the communicator to transmit, to the at least one STA, a polling frame,
cause the communicator to receive, from the at least one STA, feedback information for the at least one partial bandwidth information indicated by the announcement frame, wherein the feedback information is received in response to the polling frame, and
cause the communicator to transmit, to the at least one STA, a multiple-user (MU) physical protocol data unit (PPDU) based on the feedback information.

* * * * *